United States Patent
Nesic

(12)
(10) Patent No.: US 6,360,481 B1
(45) Date of Patent: Mar. 26, 2002

(54) PLANT-DAMAGING ANIMAL REPELLANT FENCE

(76) Inventor: Heather Nesic, 1238 Kingston Ave., Racine, WI (US) 53402

( * ) Notice: Subject to any disclaimer, the term of this patent is extended or adjusted under 35 U.S.C. 154(b) by 0 days.

(21) Appl. No.: 09/778,564

(22) Filed: Feb. 7, 2001

(51) Int. Cl.$^7$ .............................................. A01B 79/00
(52) U.S. Cl. .......................... 47/58.1; 47/20.1; 43/131; 239/53; 239/57; 256/10
(58) Field of Search ............................... 43/131, 132.1; 47/26, 58.1, 45; 256/21, 22, 19, 1, DIG. 5; 424/DIG. 10, DIG. 11; 239/53–57

(56) References Cited

U.S. PATENT DOCUMENTS

| | | | | |
|---|---|---|---|---|
| 413,507 | A | * 10/1889 | Halstead | |
| 3,405,688 | A | * 10/1968 | Gerhardi | |
| 3,747,897 | A | * 7/1973 | Conley | 256/10 |
| 4,451,460 | A | * 5/1984 | Hansen et al. | 424/238 |
| 4,552,307 | A | * 11/1985 | Stedham | 239/57 |
| 4,756,905 | A | 7/1988 | Melnik | |
| 5,083,708 | A | * 1/1992 | Walters | 239/55 |
| 5,369,909 | A | * 12/1994 | Murphy | 43/112 |
| 5,379,545 | A | * 1/1995 | Gall et al. | 43/131 |
| 5,746,019 | A | 5/1998 | Fisher | |
| 5,857,664 | A | * 1/1999 | Schauman | 256/19 |
| 6,202,342 | B1 | * 3/2001 | Edwards | 43/132.1 |

FOREIGN PATENT DOCUMENTS

FR 2600698 * 12/1987 ............ E04H/17/22

* cited by examiner

Primary Examiner—Peter M. Poon
Assistant Examiner—Andrea M. Valenti
(74) Attorney, Agent, or Firm—Jansson, Shupe & Munger Ltd.

(57) ABSTRACT

The invention involves a fence for repelling plant-damaging animals comprised of a row of tubes each having a top end and bottom end, and at least one chemical-composition-containing tube having at least one exit port; a connector for attaching each tube to each adjacent tube; and a chemical composition repellant to plant-damaging animals, contained within the at least one chemical-composition-containing tube, whereby a repellant character of the chemical composition is releaseable from the at least one chemical-composition-containing tube through the exit port. Another aspect of the invention is a method for repelling plant-damaging animals comprised of the steps of inserting a fence comprised of a plurality of a-rowed, parallel, substantially vertically-oriented tubes flexibly attached with respect to each other, each tube having an open top end and an exit port dispensed with respect to a bottom end communicating with the top end, into the ground such that the top of each tube extends above the ground, thereby enclosing an area to be protected; and inserting a quantity of chemical composition repellant to plant-damaging animals into the top end of at least one tube; whereby a repellant character of the chemical composition can be released from the exit port in order to repel plant-damaging animals.

23 Claims, 5 Drawing Sheets

PLANT-DAMAGING ANIMAL REPELLANT FENCE

FIELD OF THE INVENTION

This invention is related generally to fences and, more particularly, to fences directed to the repelling of plant-damaging animals.

BACKGROUND OF THE INVENTION

Backyard gardens are extremely popular. Americans spend great sums of money and effort in creating and maintaining these gardens. The gardens can be designed to provide fresh fruits, vegetables, and/or herbs for human consumption, to provide ornamentation, to attract particular fauna, to provide flowers with pleasant smells, or to provide a comfortable place for relaxation. The plants which make up the garden are subject to predation and disruption by vertebrate and invertebrate animals. An extensive industry exists for the chemical, electronic, and biological control of invertebrate pests. These controls are not effective against vertebrate pests such as rabbits.

To address this problem of vertebrate pests, two broad strategies presently exist, physical barriers and chemical repellants.

Physical barriers can be further divided into two broad categories: inanimate animal predators and enclosures. The former strategy utilizes replicas of predating animals such as hawks or owls, to act as "scarecrows." These "scarecrows" can be minimally effective for short duration until the pest learns that the inanimate structures pose no threat.

The latter category of physical barrier involves a degree of impenetrable barrier, usually in the form of a fence. The most effective barrier would totally enclose a plant to be protected, protecting from intrusion above and below. Such an enclosure is difficult to install, is difficult to maintain especially over large distances, is exceptionally difficult for humans to access, and is unsightly. Absent a total enclosure, fences can be scaled, vaulted, or tunneled under. Effectiveness is proportional to the height above the ground; yet the higher the fence, the more it intrudes into the aesthetics of the garden and the more it blocks light from reaching the plants. Moreover, the more substantial the fence is, the more unsightly and the more light-blocking in character it is.

Alternatively, chemical deterrents are used to repel. These typically take the form of natural substances such as blood meal and urine, or chemicals such as naphtha and Ro-pel®, which work due to the offensive character of their odor. Offensive deterrents have at least three major drawbacks: in order to be effective, they must be used in substantial amounts which become offensive to humans; they are dependant on wind direction; and because they are water-soluble, they must be frequently reapplied, especially after each rain.

Delivery of a scent directed to vertebrate animals has been addressed by the Hunter Scent System of Fisher (U.S. Pat. No. 5,746,019). Such a system works well for its intended purpose by releasing a masking scent which travels the same air currents carrying the human scent to be masked. In this manner, the system is favorably dependant on wind direction. The Fisher invention does not translate well for garden use. First, it will not protect plants upwind of even a mild breeze. Second, quantities of scent necessary to mask a clean human are substantially less than the amounts necessary to repel hungry animals. Third, the hunter can easily monitor and refresh the Fisher-system device; even a brief failure of such a system in a plant-protection application would result in plant loss.

There is a need for a new fence which will protect plants from animals.

OBJECTS OF THE INVENTION

It is an object of this invention to provide an improved fence to repel plant-damaging animals overcoming some of the problems and shortcomings of the prior art.

Another object of this invention is to provide protection of plants from animals which are willing to burrow underneath a surface-touching fence.

Another object is to discourage damage to plants while adding to the aesthetics of a yard.

Still another object of the invention is to provide an effective plant-damaging-animal barrier which will not affect the consumability of fruits, vegetables, and herbs thereby protected.

It is another object of this invention to provide an easily installable barrier.

Creating a plant-damaging-animal fence which is flexible enough to follow the contours of a nonlinear garden border is still another object of this invention.

Another object of this invention is to provide a light-weight fence which is cost-effective.

It is yet another object of this invention to provide a series of repellant-containing tubes which can surround a group of plants to be protected, thereby minimizing the potential detrimental effects of wind direction in the delivery of the repellant.

Another object of this invention is to provide protection to plants from animals which protection is humane.

It is still yet another object of the invention to provide a simple apparatus to protect the repellant from water.

These and other objects of the invention will be apparent from the following descriptions and from the drawings.

SUMMARY OF THE INVENTION

The present invention is a fence for repelling plant-damaging animals. The invention is comprised of a row of tubes each having top and bottom ends, and a connector for attaching each tube to each adjacent tube. At least one of the tubes is a chemical-composition-containing tube which has at least one exit port. Within the at least one chemical-composition-containing tube is a chemical composition repellant to plant-damaging animals, whereby a repellant character of the chemical composition is releaseable from the at least one chemical-composition-containing tube through the exit port. It is preferable that the connector is flexible.

Tapering the bottom ends of the plurality of tubes yields a preferred embodiment.

In one embodiment of the invention, the tubes are metal. It is more preferred that the tubes are aluminum.

It is preferred that the top end of the chemical-composition-containing tube is open and communicates with the at least one exit port. In this way, the chemical may be introduced into the tube through the top, and when the top is left uncapped, the odor of the chemical may escape out of the tube top further inhibiting animals from going over the fence.

It is another preferred embodiment of the invention, a rain-diverting cap is added to removably cover the top end of the at least one chemical-composition-containing tube.

One repellant, chemical composition is blood meal. Another chemical composition is Milorganite®.

It is preferred that the fence of the invention has tubes that are arranged such that a space exists between adjacent tubes within the row. In one embodiment, the space between the adjacent tubes is no more than one inch. In another embodiment, the space between the adjacent tubes is more than one inch, and in such case, a flexible screen is drawn between the adjacent tubes, thereby creating a light-transmitting, physical barrier to plant-damaging animals.

Another preferred embodiment of the fence further comprises a plurality of spacers, each having a first end with a first inlet and a second end with a second inlet, an exterior surface, and an interior surface, whereby the connector may leave the tube, enter the spacer through the first inlet, extend through the spacer, then exit the spacer through the second inlet before encountering the adjacent tube. The interior surface of each spacer may define a cavity capable of containing the chemical composition, such that the interior surface communicates with the exterior surface through at least one outlet, whereby the repellant character of the chemical composition may be released from the cavity through the at least one outlet. Further, the spacer may be rotatable about the connector.

Another aspect of this invention is a method for repelling plant-damaging animals. This method has the steps of: inserting a fence comprised of a plurality of a-rowed, parallel, substantially vertically-oriented tubes flexibly attached with respect to each other, each tube having an open top end and an exit port dispensed with respect to a bottom end communicating with the top end, into the ground such that the top of each tube extends above the ground, thereby enclosing an area to be protected; and inserting a quantity of chemical composition repellant to plant-damaging animals into the top end of at least one tube; whereby a repellant character of the chemical composition can be released from the exit port in order to repel plant-damaging animals.

It is highly preferred that the tubes be inserted into the ground to a depth no less than six inches.

In one embodiment of the method aspect of this invention, the exit port is below the ground. In another embodiment, the exit port is above the ground.

It is preferable for the tubes extend above the ground to a height of not less than twenty-four inches. It is even more preferable for the tubes to extend above the ground to a height of not less than thirty-six inches.

It is preferred in the method aspect of the invention that the tubes are arranged such that a space exists between adjacent tubes within the row. In one embodiment, the space between the adjacent tubes is no more than one inch. In another embodiment, the space between the adjacent tubes is more than one inch, and in such case, a flexible screen is drawn between the adjacent tubes, thereby creating a light-transmitting, physical barrier to plant-damaging animals.

BRIEF DESCRIPTION OF THE DRAWINGS

The drawings illustrate preferred embodiments which include the above-noted characteristics and features of the invention. The invention will be readily understood from the descriptions and drawings. In the drawings.

DETAILED DESCRIPTION OF PREFERRED EMBODIMENTS

Figure 1:
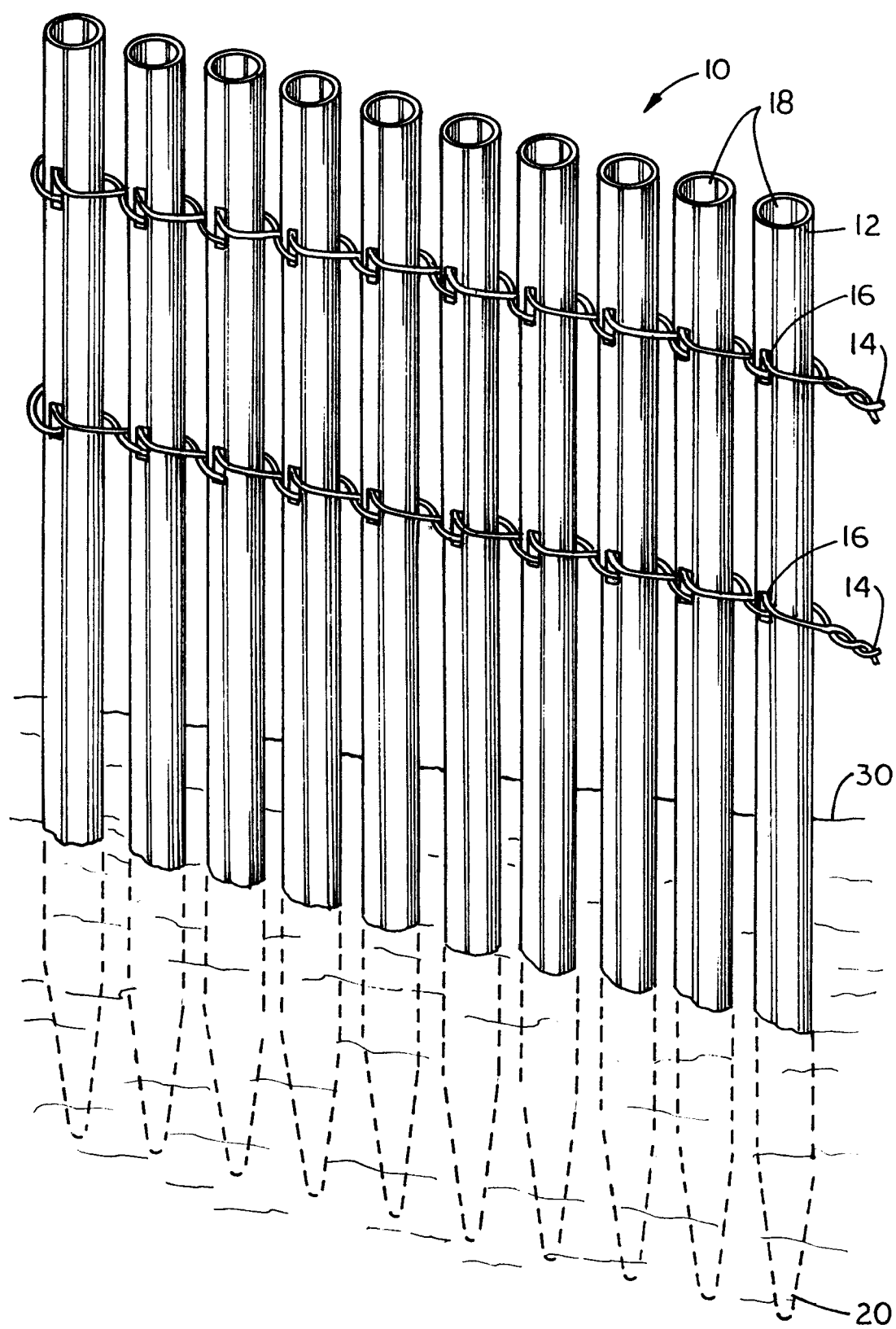
FIG. 1 is a perspective view of a preferred fence for repelling plant-damaging animals in accordance with this invention.

FIG. 1 shows a perspective view of a preferred embodiment of this invention. The fence 10 has a structure of a plurality of tubes 12 tied together by a flexible connector 14. The preferred connector is insulated 18 gauge wire. Each tube 12 is long, thin, and lightweight. As shown, tubes 12 are cylindrical, however, it will be apparent to any skilled in the art that tubes of other radial cross-sectional shapes will be of equal utility. Tubes 12 are of a thin-wall construction on the order of one-sixteenth (1/16) of an inch thick and have an outside diameter of between one-eighth (1/8) to one-half (1/2) of an inch. For a typical fence of this invention, the length of each tube 12 is at least forty-two inches. With this length, each tube 12 may be inserted into the ground 30 at least six inches leaving thirty-six inches of tube 12 length extending above the ground. For aesthetic reasons, the portion of tube 12 extending above ground 30 may be painted. The preferred material for tube 12 is. aluminum due to considerations of cost, weight, and durability. Polyvinyl chloride or other hard plastic is also a suitable material.

Each tube 12 has at least four holes 6 which exist in pairs, each hole 16 diametrically opposite its mate. An upper pair of holes 16 is located near the top end 18 of tube 12 while the lower pair of holes 16 is located near the bottom end 20 of the tube. As better illustrated in FIG. 2A, a wire connector 14 is threaded through upper pair of holes 16 near top end 18 to then be woven into the upper pair of holes 16 near the top end 18 of the next adjacent tube 12, and so forth until each of tubes 12 is attached to its neighbor, thereby creating a row. In a like manner, tubes 12 are woven together by a separate wire connector 14 threaded through holes 16 near bottom end of tubes 12.

Figure 2A:
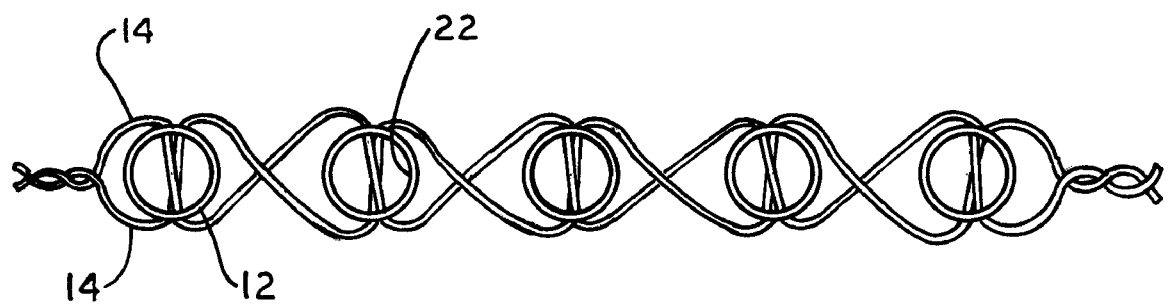
FIG. 2A is a top view of one embodiment of the fence of FIG. 1.

FIG. 2A shows a top view of the fence 10 of FIG. 1. The plurality of tubes 12 are connected into a row using two wire connectors 14 of approximately equal length. The first end of the first wire connector 14 is inserted into the upper hole 16 better seen in FIG. 1, on the front of the first tube 12 leaving about one inch of the second end of the first wire connector 14 still outside of the upper hole 16 on the front of the first tube 12. The first end of the first wire connector 14 extends through tube 12 out the upper hole 16 on the back side and enters the second tube 12 in line through the upper hole 16 on the back side and so on until the first end of the first wire connector exits an upper hole 16 of the last tube 12. The first end of the first wire connector 14 is clipped to a point approximately one inch outside of the last upper hole 16. The first end of the second wire connector 14 is inserted into the upper hole 16 on the back of the first tube 12 leaving about one inch of the second end of the second wire connector 14 still outside of the upper hole 16 on the back of the first tube 12. The first end of the second wire connector 14 extends through tube 12 out the upper hole on the front side and enters the second tube 12 in line through the upper hole 16 on the front side of the second tube 12 and extends therethrough out hole 16 on the back side of the second tube 12 then into the upper hole 16 on the back side of the third tube 12 and so on until the first end of the second wire connector 14 exits an upper hole 16 of the last tube 12. In this way a weave is created between the two wire connectors 14. The first end of the second wire connector 14 is clipped to a point approximately one inch outside of the last upper hole 16. The first ends of the two wire connectors 14 are attached typically by twisting them together; likewise the second ends of the wire connectors 14 are attached together.

Figure 2B:
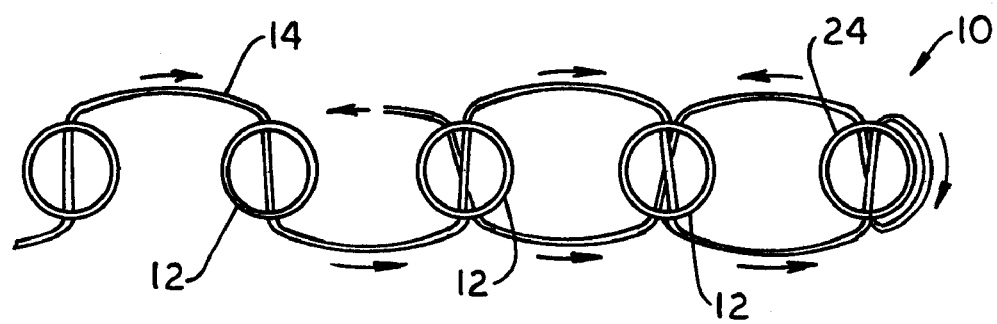
FIG. 2B is a top view of a second embodiment of the fence of FIG. 1.

FIG. 2B shows an alternative means. Each tube 12 has an inner surface 22 and an outer surface 24, and holes 16 which are slots having an axial dimension greater than twice the diameter of connector 14 and a transverse dimension greater than the diameter of connector 14. In a preferred embodiment illustrated, wire connector 14 is threaded into the upper hole 16 on the front side of the first tube 12 shown in FIG. 1, thence through tube 12 until wire connector 14 exits out the upper hole 16 on the back side of tube 12. Wire connector 14 then enters the second tube 12 which is the next adjacent tube 12 in line through the upper hole 16 in the backside of that second tube 12. Wire connector 14 is threaded through the second tube 12, exiting the second tube 12 through the upper hole 16 to the front side; thence through the upper hole 16 in the front side of the third tube 12 in line out the upper hole 16 in the backside of the third tube 12 in line and so on down to the last tube 12 in line. At the point at which wire connector 14 has first extended through the last tube 12 in line and exited through the upper hole 16 in the last tube in line it will wrap around approximately one-half of the circumference along the outer surface 24 of the last tube 12 and re-enter the upper hole 16 through which it had first entered the last tube 12 which entry hole 16 is diametrically opposite hole 16 it had just immediately exited. Fence 10 shown has an even number of tubes 12 and thus wire connector 14 is shown entering the upper hole 16 on the back side of the last tube 12 in line; in a configuration offence 10 having an odd number of tubes 12, wire connector would enter the last tube 12 in line through the upper hole 16 in the front of tube 12. Wire connector 14 is then woven back down the line of tubes 12 to the point of beginning by re-entering each tube 12 through the same hole 16 by which it had previously entered and exiting each tube 12 by the same hole 16 by which it had previously exited. At the point of beginning, wire connector 14 will be connected to itself. This connection is best accomplished by twisting the ends together, as shown in the alternative embodiment at either end of fence 10 in FIG. 2A. In this manner, the flexible fence 10 may be created such that when installed it can follow the contours of a garden with nonlinear borders.

For stability, tubes 12 are attached together by a wire connector 14 woven through the lower holes 16 in a like manner.

Figure 2C:
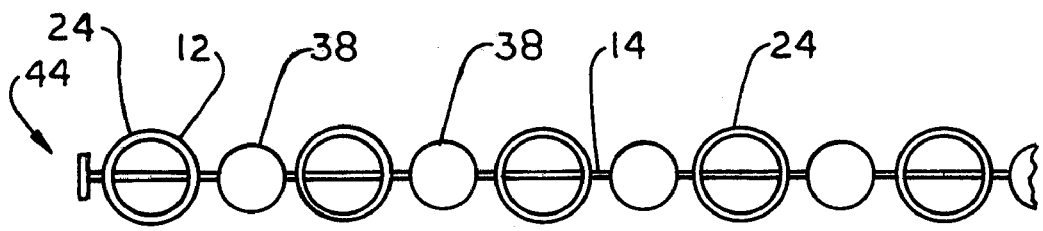
FIG. 2C is a top view of a third embodiment of the fence of FIG. 1.

FIG. 2C shows a third type of connection. In this embodiment of the invention, holes 16 are dimensioned larger than the diameter of connector 14. The second end of connector 14 is tied in a knot to form a stop 44 such that it will not fit through hole 16. The first end of connector 14 is strung through the upper holes 16 of the first tube 12 in the row until the stop 44 encounters the outer surface 24 of the first tube surrounding the first upper hole 16. Connector 14 is then strung through the upper holes 16 of each of the remaining tubes 12 in the row. As the first end of connector 14 exits the last hole 16 of the last tube 12 in the row, the first end is tied in a knot near the outer surface of the last tube 12 in the row to prevent the unstringing of tubes 12 from connector 14. To maintain a one inch spacing between tubes 12, a bead 38 having an inner diameter greater than the diameter of connector 14 may be strung on connector 14 between tubes 12 as a spacer. In the embodiment using the bead 38 as a spacer, a resilient material such as an elastic cord may be used for the connector 14. As an alternative to beads, the space between tubes 12 can be maintained through the use of stops 44 such as knots tied close to each hole 16 as connector 14 enters and exits each tube 12.

It should be noted that wire is not the only suitable material for creating a connector 14. By way of example only, other suitable materials would include nylon twine or cloth string. Moreover, it should be apparent to any skilled in the art that it is not necessary for connector 14 to be woven through tubes 12 in order to provide an effective connection. A suitable connector 14 could connect tubes 12 by encountering tubes 12 on their outer surface 24.

Figure 3A:
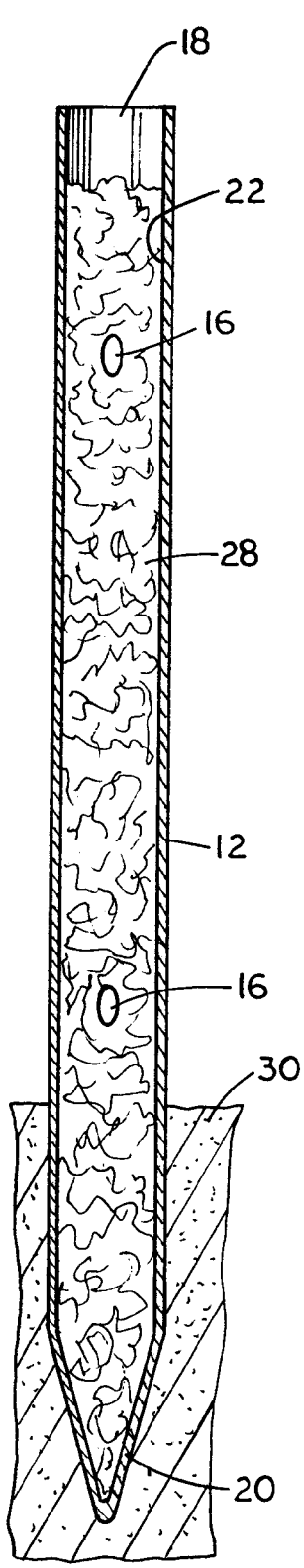
FIG. 3A is a side view in cross-section of one of the tubes from FIG. 1.
Figure 3B:
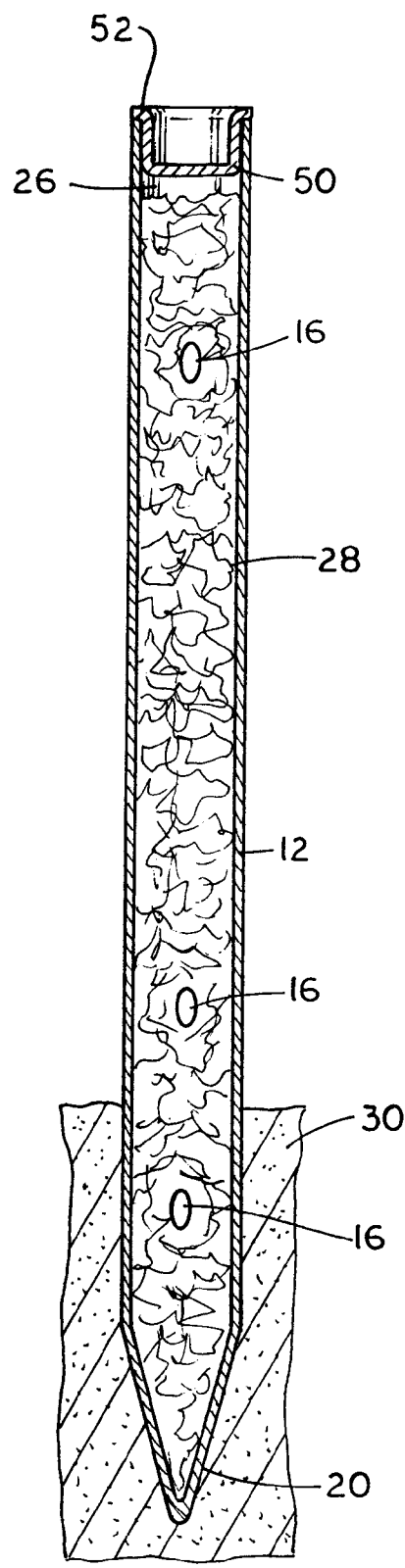
FIG. 3B is a side view in cross-section of one of the tubes from FIG. 1 with an additional exit port.

FIG. 3A shows a side view of one of tubes 12 of FIG. 1 in cross section. Apparent from this diagram is that the inner surface 22 of tube 12 creates a cavity 26. Two of the four holes 16 are shown, one dispensed near the lower end of cavity 26 and the other near the upper end. Two additional holes 16 exist diametrically opposite two holes 16 shown, on the portion of the cut away to create the drawing. Through these holes 16, connector 14 (not shown in this diagram) is threaded. A chemical 28 introduced through top end 18 of tube 12 resides in the bottom end of cavity 26. Preferred chemicals 28 include Ro-pel®, Milorganite®, naphtha, and blood meal. The repellant character of chemical 28 is releasable from the four holes 16 which act as exit ports. There may be more than one exit port 16 to release the repellant character of chemical 28 within cavity 26. As shown in FIG. 3A, the lowest exit port is a hole 16 above the surface of the ground 30. As shown in FIG. 3B, the lowest exit-port hole 16 may be located below the surface of ground 30. In this latter manner, animals are discouraged from tunneling under the fence.

As shown in FIG. 3A, the exit-port holes 16 communicate through cavity 26 to top end 18 of tube 12. In this arrangement, when installed, the offensive character of chemical 28 may be released through top end 18 of tube 12 further discouraging animals from hopping over the fence. Further, with top end 18 being open, it allows for rainwater to enter tube 12 and interact with chemical 28 while in cavity 26. Such an arrangement will hasten release of chemical 28 through the exit port 16 located at the lower end of cavity 26. As shown, bottom end 20 is tapered to a point to facilitate installation into ground 30.

Shown in FIG. 3B is an optional upper compartment 50. Upper compartment 50 is a thin-walled cylinder having a sealed bottom and open top. It is preferably made of plastic. Upper compartment 50 has an axial length of no more than about two (2) inches. Upper compartment 50 has an outer diameter substantially equal to the inner diameter of the inner surface 22 of the top end of tube 12 into which it will be placed in order that it will provide a snug fit yet be removable. The upper portion of upper compartment 50 has a lip 52 having an outer circumference with a diameter substantially equal to the outer diameter of outer surface 24 of the top end of tube 12 into which upper compartment 50 will be placed. In this way, lip 52 will prevent upper compartment 50 from sliding into tube 12 past lip 52.

Upper compartment 50 may be removed from the top of tube 12 allowing chemical 28 to be introduced through the top into cavity 26. Once replaced into the top of tube 12, upper compartment 50 presents chamber into which second animal-repelling chemical 28 may be placed such that the two (2) chemicals 28 will not interact with each other. Chemical 28 in cavity 26 communicates though holes 16 without interference from upper compartment 50. The offensive character of chemical 28 placed in upper compartment 50 will be released through the top of tube 12.

Figure 4:
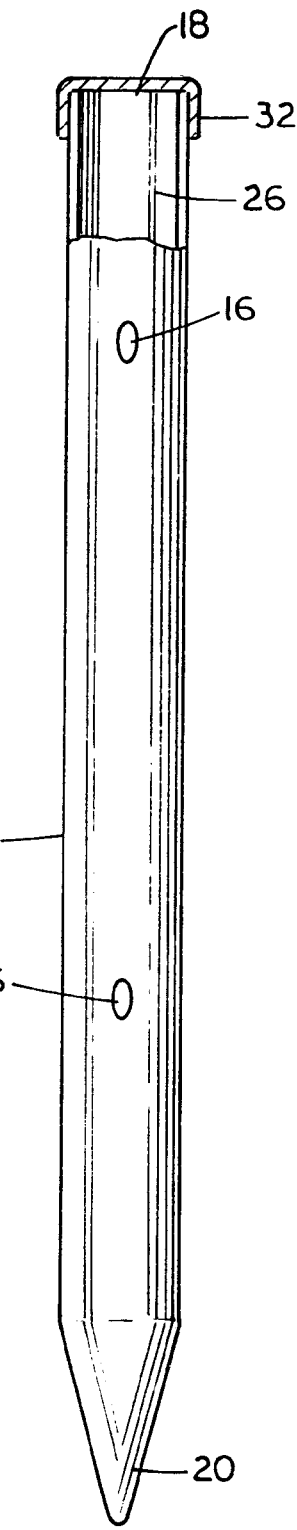
FIG. 4 is a front view of one of the tubes from FIG. 1 in partial cut-away.

Shown in FIG. 4, rather than top end 18 of tube 12 remaining open, it may be fitted with a replaceable cap 32. Cap 32 would be removable to allow for insertion of chemical 28 into cavity 26 through open top end 18 of tube 12. Cap 32 would then be replaced on top end 18 of tube 12 to prevent rainwater from entering into cavity 26. In this manner, the release of chemical 28 from cavity 26 through the exit port hole 16 would be minimized.

Figure 5:
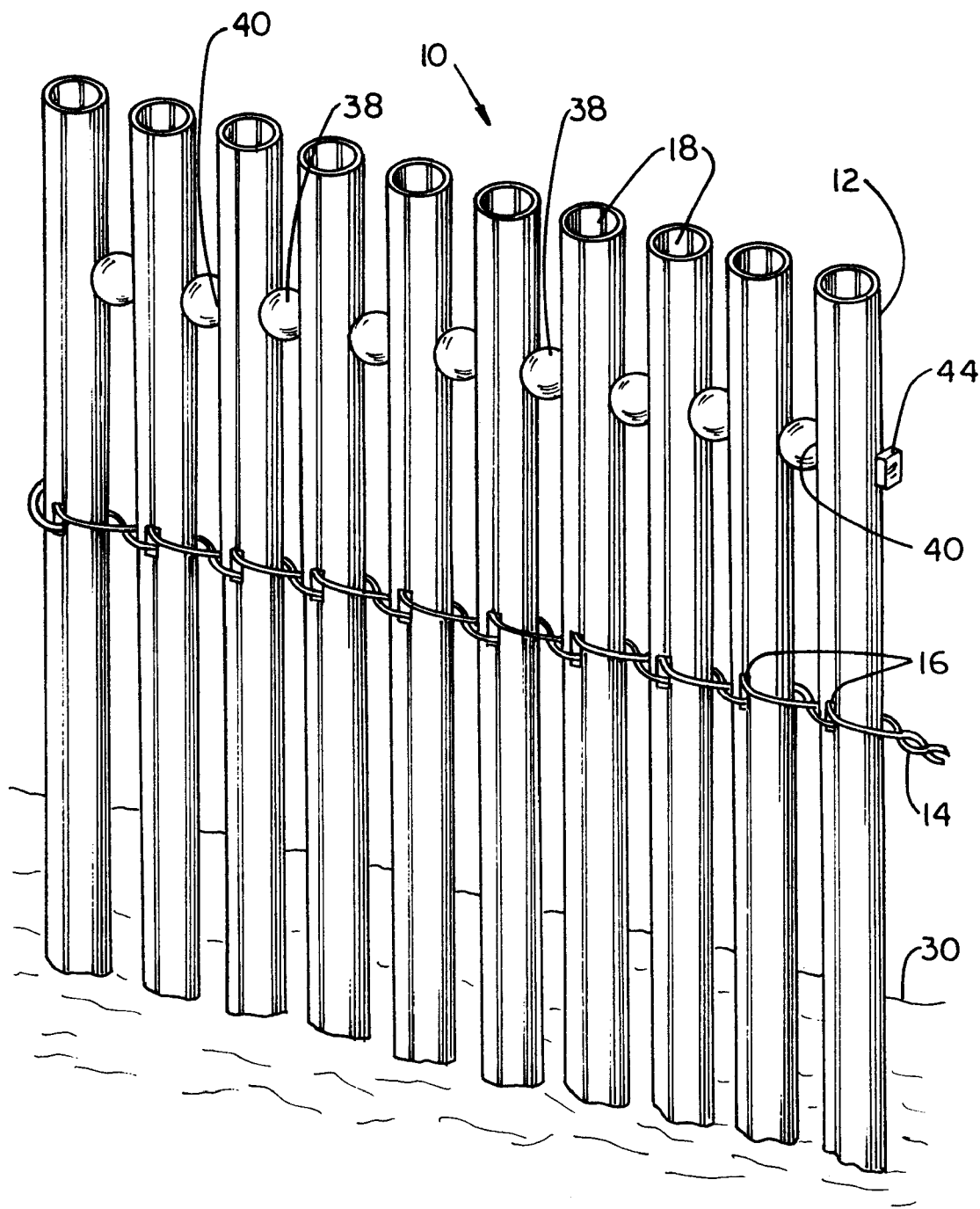
FIG. 5 is a sectional side view of the embodiment of FIG. 2C.

FIG. 5 shows a fence 10 with spacers 38 located between adjacent tubes 12. In this embodiment, a single-strand connector 14 (better seen in FIG. 2C) is alternately threaded through tubes 12 and spacers 38. The connector 14 enters and exits tubes 12 through diametrically opposite holes 16 (better seen in FIG. 4) and enters and exits spacers 38 through the inlets 40 better seen in FIG. 6. A stop 44 is located at each extreme end offence 10. This stop 44 is most typically a knot.

As shown, only the upper connector 14 (not seen) holds spacers 38. Alternatively, the lower connector 14 could hold the spacers. This latter arrangement is beneficial when it is desired to deliver the chemical 28 closer to the ground 30. A yet more effective delivery system can be provided when the spacers 38 are located on both the upper and lower connectors 14. The dual system has the drawbacks of requiring twice the number of spacers 38 and twice the maintenance effort to keep them full of chemical 28.

Figure 6:
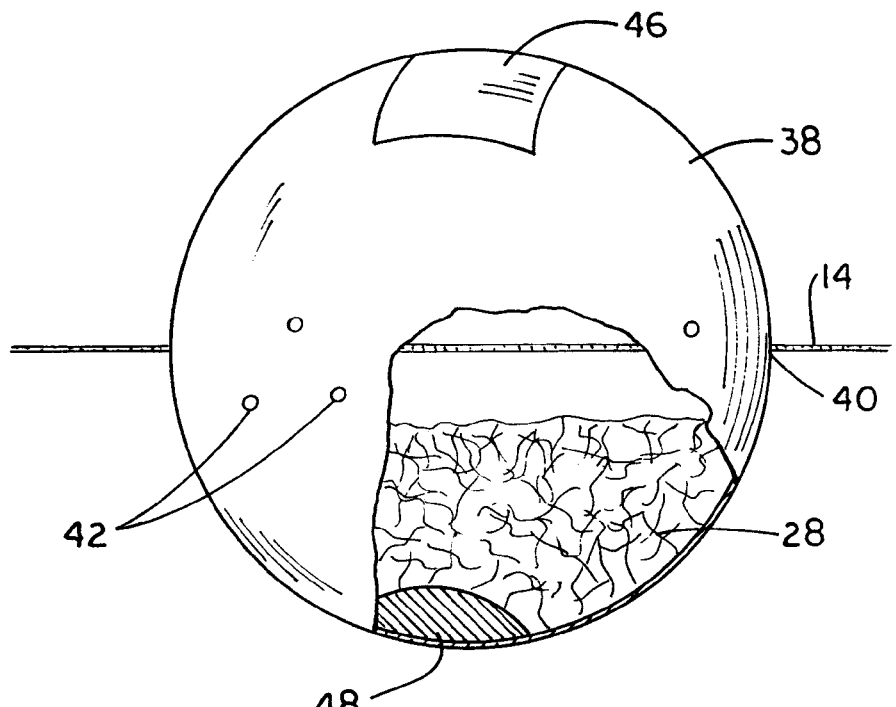
FIG. 6 is a partial cut-away view of one of the spacers of FIG. 5.

As best seen in FIG. 6, spacer 38 is most preferably a hollow sphere. The sphere is light-weight, preferably made of a thin plastic. A hatch 46 is cut into spacer 38 to create a flap through which chemical 28 may be introduced. A weight 48 is fixed to a point on the inner surface of spacer 38 which is perpendicular to connector 14 as connector 14 travels through spacer 38. In this manner, gravity will cause spacer 38 to repose in an equilibrium state with the weighted end of spacer 38 pointing down to the ground thereby creating a lower pole. It is preferred, but not necessary, that the weight 48 is located within the interior of the spacer 38; located within the spacer 38, the weight 48 helps to keep the chemical 28, when in powdered form, from clumping. Apertures 42 are regularly placed around the equator. At rest, with apertures 42 located at the equator, rainwater will not easily enter the sphere and chemical 28 will not flow out of the sphere. When an animal attempts to scale fence 10 and encounters spacers 38, spacers 38 will rotate about connector 14 causing chemical 28 to be ejected from the interior of spacer 38 through apertures 42.

Figure 7:
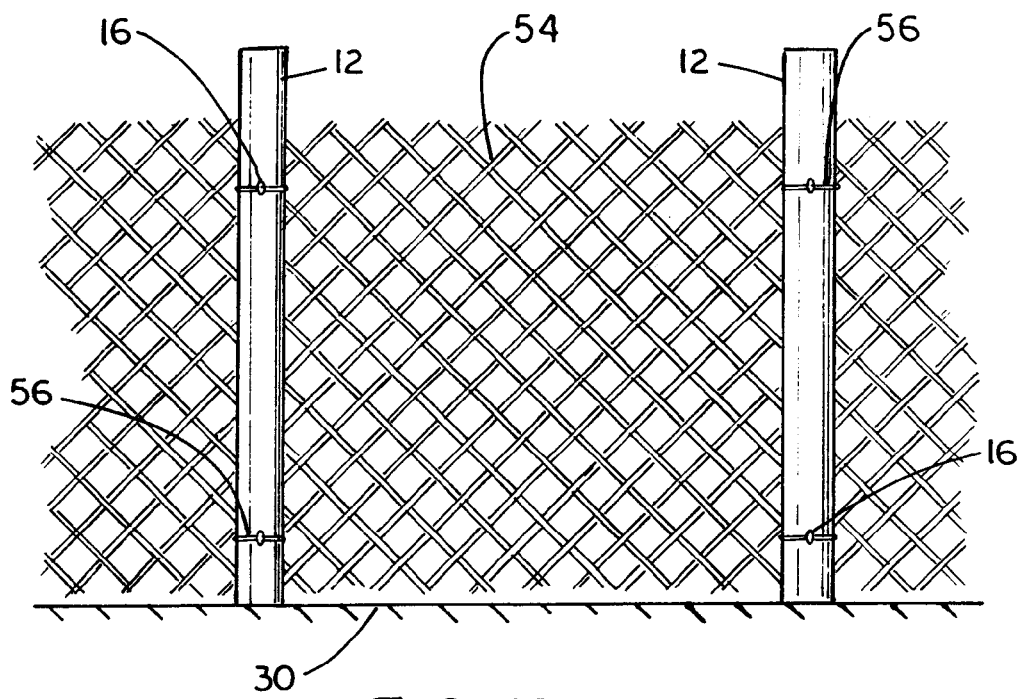
FIG. 7 is a front view of another embodiment of the invention having a screen stretched between tubes.

FIG. 7 shows a front view of another embodiment of this invention. A space exists between adjacent tubes 12. When that space exceeds one inch, it is preferable to stretch a light-transmitting screen 54 between adjacent tubes 12 in order to create a physically impenetrable barrier. Screen 54 can consist of a mesh such as chicken wire, a plastic mesh, wood slats, etc. Not only does such screen 54 provide a physical deterrent to plant damaging animals such as rabbits, it further delays the animal such that chemical repellent 28 can be experienced. Screen 54 is attached to tubes 12 by wire strips 56. As shown, wire strips 56 attach screen 54 to tube 12, then wrap around tube 12 entering hole 16, exiting tube 12 opposite the entrance hole 16 where strip 56 is secured.

FIGS. 1 and 3A also demonstrate a method for repelling plant-damaging animals. A fence 10 comprised of a plurality of a-rowed, parallel, substantially vertically-oriented tubes 12 flexibly attached with respect to each other with a separation of no more than one inch by a connector 14 is obtained. Each tube 12 has an open top end 18 which communicates with a cavity 26 within tube 12. Near the bottom of cavity 26 is an exit-port hole 16. Fence 10 is laid out in a manner such that the plants to be protected are fully enclosed by the fence. All of tubes 12 of the fence are pounded (with a mallet, sledge, hammer, etc.) into ground 30 to a depth of at least six inches to prevent animals from tunneling under fence 10 once fully installed. Once fence 10 is in place around the plants, a quantity of chemical 28 repellant to plant-damaging animals is inserted into the top end of at least one tube 12 and dropped into cavity 26. As the exit-port hole 16 is dispensed near the bottom of cavity 26, the repellant character of chemical 28 can be released from the exit-port holes 16. In general, the exit-port holes 16 are located above ground 30 level to repel animals such as rabbits. If tunneling or burrowing animals are of a greater problem, tubes 12 may include an additional exit port 16 shown below the surface of earth 30 in FIG. 3B or alternatively, tube 12 may be pounded further into ground 30 to provide deposition of chemical 28 through the exit-port holes 16 directly to a target area below the surface of ground 30.

While the principles of this invention have been described in connection with specific embodiments, it should be understood clearly that these descriptions are made only by way of example and are not intended to limit the scope of the invention.

What is claimed is:

1. A fence for repelling plant-damaging animals comprised of:
   a row of tubes each having a top end and bottom end, and at least one chemical-composition-containing tube having at least one exit port;
   a connector for attaching each tube to each adjacent tube; and
   a chemical composition repellant to plant-damaging animals, contained within the at least one chemical-composition-containing tube,
whereby a repellant character of the chemical composition is releaseable from the at least one chemical-composition-containing tube through the exit port.

2. The fence of claim 1 wherein the connector is flexible.

3. The fence of claim 1 wherein the bottom ends of the plurality of tubes are tapered.

4. The fence of claim 3 wherein the tubes are metal.

5. The fence of claim 4 wherein the tubes are aluminum.

6. The fence of claim 1 wherein the top end of the chemical-composition-containing tube is open, and further comprising a compartment located within and near the top of the chemical-composition-containing tube whereby the chemical composition may be placed within the compartment and the repellant character of the chemical composition may be released through the top of the tube.

7. The fence of claim 1 wherein the top end of the chemical-composition-containing tube is open and communicates with the at least one exit port.

8. The fence of claim 7 further comprising a rain-diverting cap to removably cover the top end of the at least one chemical-composition-containing tube.

9. The fence of claim 1 wherein the chemical composition is blood meal.

10. The fence of claim 1 wherein the tubes are arranged such that a space exists between adjacent tubes within the row.

11. The fence of claim 10 wherein the space between the adjacent tubes is no more than one inch.

12. The fence of claim 10 wherein the space between the adjacent tubes is more than one inch, further comprising a flexible screen drawn between the adjacent tubes, thereby creating a light-transmitting, physical barrier to plant-damaging animals.

13. The fence of claim 10 further comprising a plurality of spacers, each having a first end with a first inlet and a second end with a second inlet, an exterior surface, and an interior surface, whereby the connector may leave the tube, enter the spacer through the first inlet, extend through the spacer, then exit the spacer through the second inlet before encountering the adjacent tube.

14. The fence of claim 13 wherein the interior surface of each spacer defines a cavity capable of containing the chemical composition, and the interior surface communicates with the exterior surface through at least one outlet, whereby the repellant character of the chemical composition may be released from the cavity through the at least one outlet.

15. The fence of claim 14 wherein the spacer is rotatable about the connector.

16. A method for repelling plant-damaging animals comprised of the steps of:

inserting a fence comprised of a plurality of a-rowed, parallel, substantially vertically-oriented tubes flexibly attached with respect to each other, each tube having an open top end and an exit port dispensed with respect to a bottom end communicating wit h the top end, into the ground such that the top of each tube extends above the ground, thereby enclosing an area to be protected; and inserting a quantity of chemical composition repellant to plant-damaging animals into the top end of at least one tube;

whereby a repellant character of the chemical composition can be released from the exit port in order to repel plant-damaging animals.

17. The method of claim 16 wherein the tubes are inserted into the ground to a depth no less than six inches.

18. The method of claim 17 wherein the exit port is below the ground.

19. The method of claim 16 wherein the exit port is above the ground.

20. The method of claim 16 wherein the tubes extend above the ground to a height of no less than twenty-four inches.

21. The method of claim 20 wherein the tubes extend above the ground to a height of no less than thirty-six inches.

22. The method of claim 20 wherein the tubes are each separated from at least one adjacent tube by no more than one inch.

23. The method of claim 20 wherein the space between the adjacent tubes is more than one inch, further comprising the step of attaching a flexible screen extended between the adjacent tubes, thereby creating a light-transmitting, physical barrier to plant-damaging animals.

* * * * *

UNITED STATES PATENT AND TRADEMARK OFFICE
CERTIFICATE OF CORRECTION

PATENT NO.    : 6,360,481 B1                                           Page 1 of 1
DATED         : March 26, 2002
INVENTOR(S)   : Heather Nesic It is certified that error appears in the above-identified patent and that said Letters Patent is hereby corrected as shown below:

Column 4,
Line 33, delete ".”
Line 36, delete "6" and insert -- 16 --.
Line 47, between "end" and "of", insert -- 20 --.

Signed and Sealed this

First Day of October, 2002

Attest:

Attesting Officer

JAMES E. ROGAN
Director of the United States Patent and Trademark Office